No. 637,628. Patented Nov. 21, 1899.
J. R. MACKAY.
STEAM GENERATOR.
(Application filed Apr. 29, 1899.)

(No Model.)

Witnesses
Saml R. Turner
Henry T. Bright

Inventor
J. Russell Mackay.
By Frederick Benjamin
Attorney

THE NORRIS PETERS CO., PHOTO-LITHO., WASHINGTON, D. C.

UNITED STATES PATENT OFFICE.

JOHN RUSSELL MACKAY, OF NEW YORK, N. Y.

STEAM-GENERATOR.

SPECIFICATION forming part of Letters Patent No. 637,628, dated November 21, 1899.

Application filed April 29, 1899. Serial No. 714,955. (No model.)

*To all whom it may concern:*

Be it known that I, JOHN RUSSELL MACKAY, a citizen of the United States, residing at 452 Henry street, New York, (Brooklyn,) in the county of Kings and State of New York, have invented certain new and useful Improvements in Steam-Generators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in steam-generators and to feed-water heaters and like apparatus where heated gases traverse flues or tubes for heating water or for other purposes, and has for its object to provide a flue or tube lining whereby a maximum amount of heat is intercepted from the gases before they are discharged.

The invention consists in the construction and employment of a baffle-liner within the tubes or flues through which the gases pass, such baffle-liner being formed from corrugated or other metal plate which is bent into circular form and fitted within the tube or flue, so that the exterior edges or faces of the corrugations or ribs of the plate shall lie in contact with the interior of the tube, while the body of the plate shall form longitudinal chambers through which the gases pass, thus causing them to come in contact with a relatively large superficial area, the maximum amount of heat being by this means intercepted and retained for augmenting the temperature of the water in the boiler or elsewhere.

Modifications of the invention are shown in which a plate having ribs or projections is substituted for the corrugated plate, the function and operation being practically the same, and also in which two plates are used instead of one.

My invention is illustrated in the accompanying drawings, which form a part of this application, in which—

Figure 1:
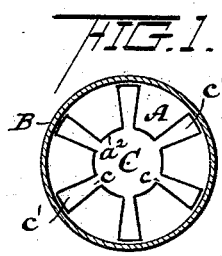
Figure 2:
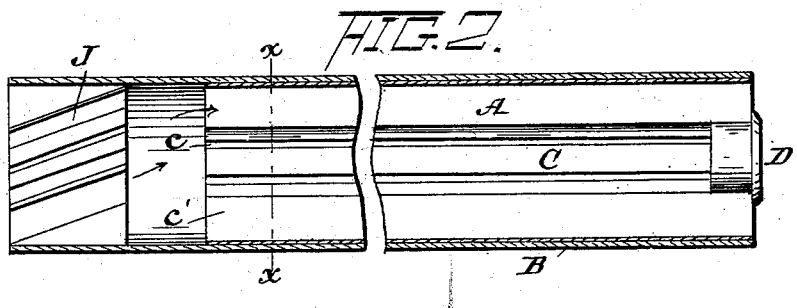
Figure 3:
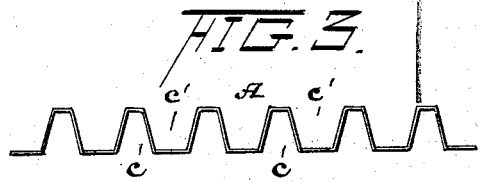
Figure 4:
Figure 5:
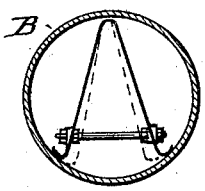
Figure 6:
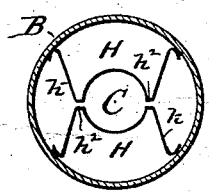

Figure 1 is a sectional view of a flue having an inner baffle-liner made according to my invention and represents a cross-section on the line $x\,x$ of Fig. 2. Fig. 2 is a longitudinal sectional view corresponding to Fig. 1. Fig. 3 is an edge view or end elevation of a corrugated plate forming the baffle-liner when bent into circular form. Figs. 4 to 8, inclusive, represent modified forms of baffle-liner plates within the scope of my invention.

In producing a baffle-liner in accordance with the design shown in Figs. 1, 2, and 3 I longitudinally bend or crimp a sheet of iron A or other suitable metal to form corrugations $a$, whose outer edges $a'$ are substantially flat or but slightly curved, so that when the plate is bent into circular or cylindrical form it shall fit and be pressed into close contact with the interior of the tube or flue $b$, in which it is inserted, while the edges $a^2$ of the plate are of such proportions and so disposed as to leave narrow longitudinal interstitial spaces $c$, through which the gases may pass to the spaces partially inclosed by the corrugated parts. At one end of the liner a cap or plug D is provided, which closes the inner tubular space C, so that thereby the gases are forced to pass from the said space through the narrow spaces $c$ to the longitudinal spaces $c'$ and thence to the outlet.

In carrying my invention into effect the ribs or projections may be diagonally formed, so as to be spirally disposed within the tube when the liner is inserted therein, or the inner tube may be conically formed instead of cylindrical and a cap or plug introduced at one end of conical form to tightly fit and press the liner in contact with the interior of the tube or flue.

Figure 7:
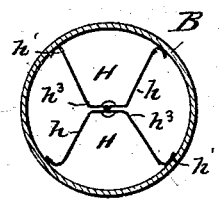
Figure 8:
Figure 8:
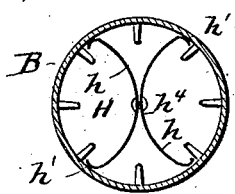

As shown in Figs. 7 and 8, the baffle-liner may be produced from two plates H, arranged to form a central space C, the arms $h$ being provided with flanges $h'$, which lie against the inner face of the tube B. The plates H lie one against the other upon their edges $h^2$ or $h^3\,h^4$, which are preferably inclined, so that each of the plates of the liner is wedge-shaped, thereby permitting of one part being first introduced and the other being forced into its proper position.

It is obvious that the baffle-liner may be formed from cast instead of sheet metal. It may be perforated to permit the passage of the gases from one side to the other of any of the partitions, as may be found desirable.

Having thus described my invention, what

I claim as new, and desire to obtain by Letters Patent, is—

1. A liner for boiler-tubes composed of a sheet-metal plate bent longitudinally to form a central chamber and to form branches extending radially from said central chamber, substantially as set forth.

2. A liner for boiler-tubes composed of a sheet-metal plate bent to form a central chamber and to form open branches extending radially from said central chamber and communicating therewith, substantially as set forth.

3. A liner for boiler-tubes composed of a sheet-metal plate bent longitudinally to form a central chamber and to form open branches communicating with said central chamber in combination with a deflector at the entrance to said liner, substantially as described.

4. A liner for boiler-tubes composed of a sheet-metal plate bent longitudinally to form a central chamber and to form branches extending radially from said central chamber, and a plug for closing one end of the central chamber, substantially as set forth.

5. A liner for boiler-tubes composed of a sheet-metal plate bent longitudinally to form a central chamber and to form open branches communicating with said central chamber, in combination with a deflector at the entrance of said liner and a plug or closure for one end of the central chamber, substantially as set forth.

In testimony whereof I affix my signature in presence of two witnesses.

JOHN RUSSELL MACKAY.

Witnesses:
FRANK CONNOR,
JAMES B. DUNLOP.